US010692298B2

(12) United States Patent
Wallis et al.

(10) Patent No.: US 10,692,298 B2
(45) Date of Patent: Jun. 23, 2020

(54) ADAPTIVE LABELING OF NETWORK GRAPHS

(71) Applicant: International Business Machines Corporation, Armonk, NY (US)

(72) Inventors: Graham D. Wallis, West Wellow (GB); Graham Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 15/885,133

(22) Filed: Jan. 31, 2018

(65) Prior Publication Data

US 2019/0236848 A1 Aug. 1, 2019

(51) Int. Cl.
| | | |
|---|---|---|
| *G06T 15/00* | (2011.01) | |
| *G06T 19/20* | (2011.01) | |
| *G06T 11/20* | (2006.01) | |
| *G06F 16/901* | (2019.01) | |
| *G06F 16/2457* | (2019.01) | |
| *H04L 12/24* | (2006.01) | |

(52) U.S. Cl.
CPC ........ *G06T 19/20* (2013.01); *G06F 16/24578* (2019.01); *G06F 16/9024* (2019.01); *G06T 11/206* (2013.01); *H04L 41/12* (2013.01); *G06T 15/005* (2013.01)

(58) Field of Classification Search
CPC ......... G06T 19/00; G06T 17/20; G06T 17/00; G06T 15/10; G06T 15/00
USPC ....................................................... 345/419
See application file for complete search history.

(56) References Cited

U.S. PATENT DOCUMENTS

| | | | |
|---|---|---|---|
| 4,779,213 A * | 10/1988 | Luitje | ..................... G01P 3/489 324/166 |
| 7,617,194 B2 | 11/2009 | Liu et al. | |
| 8,793,283 B1 * | 7/2014 | Austern | .............. G06F 11/1451 707/798 |
| 8,825,384 B2 | 9/2014 | Spindler et al. | |
| 9,576,073 B2 | 2/2017 | Pajor et al. | |
| 9,953,049 B1 * | 4/2018 | Hajaj | ....................... G06F 16/23 |
| 2005/0122323 A1 * | 6/2005 | Huang | .................... G06T 9/001 345/421 |
| 2013/0321400 A1 | 12/2013 | van Os et al. | |
| 2016/0357872 A1 * | 12/2016 | Fader | ..................... G06Q 10/00 |

(Continued)

OTHER PUBLICATIONS

Evans, T.S., Complex Networks, May 2004, [Retrieved on Mar. 29, 2019], Retrieved from the internet, <URL: https://arxiv.org/pdf/cond-mat/0405123.pdf> (Year: 2004).*

(Continued)

*Primary Examiner* — Gordon G Liu
(74) *Attorney, Agent, or Firm* — Christopher M. Pignato

(57) ABSTRACT

For each vertex of a network graph that includes a set of vertices, a meta-property of the vertex is determined relative to other vertices of the set of vertices, a distance of the vertex from a user's viewpoint of a three dimensional (3D) rendering of the network graph is determined, and a ranking figure is calculated as a function of the determined meta-property in combination with the determined distance. The set of vertices of the network graph is ranked as a function of the respective calculated ranking figures. Labels for a subset of the set of vertices are selectively displayed on a display as a function of the ranking.

17 Claims, 5 Drawing Sheets

(56) References Cited

U.S. PATENT DOCUMENTS

2017/0083364 A1*  3/2017  Zhao ............... G06F 9/4818
2018/0102062 A1*  4/2018  Livni ............... G09B 17/003
2018/0225576 A1*  8/2018  Pappu ............... G06N 5/04

OTHER PUBLICATIONS

Ruo-Wei Hung, [Abstract] Optimal vertex ranking of block graphs, Journal of Information and Computation, Nov. 2008, pp. 1-2 (Abstract only), vol. 206, Issue 11, Academic Press, Inc., Duluth, MN, USA.
Valery Van Kerrebroeck, et al., [Abstract] Ranking Vertices or Edges of a Network by Loops: A New Approach, PubMed.gov, Sep. 2008, pp. 1-4 (Abstract only), Published at: https://www.researchgate.net/publication/23316175_Ranking_Vertices_or_Edges_of_a_Network_by_Loops_A_New_Approach.

* cited by examiner

ADAPTIVE LABELING OF NETWORK GRAPHS

BACKGROUND

The present invention relates to computer performance improvements for real-time network graph rendering. More particularly, the present invention relates to adaptive labeling of network graphs.

A three-dimensional (3D) graph may include multiple different vertices that are distributed and connected in a 3D arrangement. The connections between the vertices are termed edges.

SUMMARY

A computer-implemented method includes, by a processor, for each vertex of a network graph that includes a plurality of vertices: determining a meta-property of the vertex relative to other vertices of the plurality of vertices; determining a distance of the vertex from a user's viewpoint of a three dimensional (3D) rendering of the network graph; and calculating a ranking figure as a function of the determined meta-property in combination with the determined distance. The computer-implemented method further includes the processor: ranking the plurality of vertices of the network graph as a function of the respective calculated ranking figures; and selectively displaying, on a display, labels for a subset of the plurality of vertices as a function of the ranking.

A system that performs the computer-implemented method and a computer program product that causes a computer to perform the computer-implemented method are also described.

DETAILED DESCRIPTION

Figure 1:
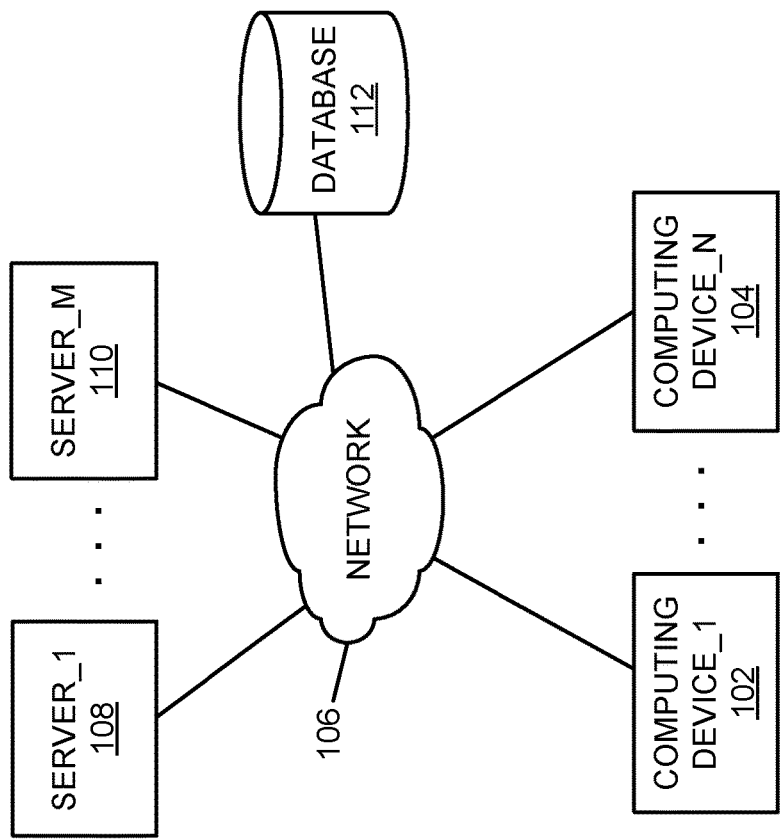
FIG. 1 is a block diagram of an example of an implementation of a system for adaptive labeling of network graphs according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides adaptive labeling of network graphs. Large network graphs may include vertex counts on the order of hundreds of thousands to millions of interconnected vertices arranged in a three dimensional (3D) arrangement, and interconnected by edges. The data represented at the respective vertices may change in real time. A network graph may be displayed via a user interface of a computing device, and computing device users may manipulate user interface (UI) controls to initiate real-time changes to the rendered orientation, scale, and quantity of the rendered 3D vertices of the network graphs. These real-time UI changes include factors such as the user zooming in, zooming out, scrolling, moving, and otherwise adjusting either locations or a quantity of vertices that are displayed.

It was observed that these types of real-time data and user interface changes impose computer processing demands related to real-time rendering of large 3D network graphs. Further, generation of real-time 3D output renderings of all or a portion of a large network graph is subject to real-time computational and rendering performance constraints of the underlying computing platform/device on which the network graphs are rendered. These real-time computational and rendering performance constraints include factors such as central processing unit (CPU) architecture and operating speed as they relate to CPU capacity and occupancy/load; display resolution and display refresh capabilities and refresh periodicity/rate of the output display device; and other real-time computer processing constraints.

The present technology solves recognized computer computational and display output performance problems associated with calculating and rendering labels for large three dimensional (3D) network graphs. The present technology solves these problems by providing a new form of computational processing for programmatic determination and selection of which vertices of a 3D network graph to label. The determination of which vertices to label is based upon a two-dimensional (2D) user perspective relative to user-initiated real-time changes to 3D rendered orientations of vertices of the 3D network graph and real-time changes to the underlying data associated with the rendered vertices.

The technology described herein adapts to real-time computational and display output performance impacts that result from real-time user-initiated and underlying data changes. Computer automation is described herein that adapts both the calculation and display of labels of vertices to user-initiated real-time changes to the 3D rendered orientations of the vertices and to any underlying real-time data changes of the vertices. Computational processing for labeling vertices may be further adapted to computer performance impacts associated with calculating and rendering of labels as a magnitude of user-initiated real-time changes of orientation and real-time changes of underlying data of the vertices adjust real-time computational demands. The selection of which vertices to label responsive to these real-time changes may be further enhanced by computational calculation of 3D distances of vertices relative to a calculated or designated "viewpoint" that approximates a viewing location of the user. It is understood that, for purposes of the description herein, the "viewpoint" of the user or "user's viewpoint" is a specified 3D location relative to the 3D network graph that does not necessarily coordinate with a feature of a particular user, but is instead a location/point at which a set of vectors that each project from a respective vertex of the 3D model focus and terminate for purposes of the calculations described herein.

Accordingly, as the underlying data of the vertices themselves change dynamically over time, and further as a user modifies a display orientation or perspective of the 3D network graph, performance of the computational processing for calculating and display processing for rendering labels may be monitored and managed to improve rendering performance of the computer. Labels for a subset of the vertices may be selectively displayed to avoid computer performance degradation that would otherwise interfere with the user experience. The technology described herein resolves previous technical computer performance problems, such as computer performance degradation, label or other image flicker, overwhelmed output views with labels overlapping to an extent of being crowded beyond viewer comprehension, and viewer cognitive overload. As described herein, the present technology improves operational processing capabilities of the computing device itself, and improves the user interface of computing devices that are tasked with rendering 3D network graphs.

Some terminology used in describing some embodiments of the present invention will now be explained. A "network graph" is hereby defined as an inter-related set of elements that represent entities and relationships between the entities. For example, the entities may include people, building structures, town/cities, applications for services or employment, financial transactions, insurance claims, documents that detail automobile accidents, and other elements that are inter-related by a computer process or that are physically inter-related according to a formalized relationship (e.g., family members, fellow employees, etc.). Many different types of entities may be represented within a single network graph, and a single network graph may represent thousands up to millions of entities. Network graphs are used by computers to process the respective entities and relationships in a manner that is well-suited to efficient computational analysis of possible roles, relative importance, and interactions of and between the entities represented in the graph; where such analysis would otherwise require prohibitive amounts of computational processing if network graphs were not used because of the magnitude of the number of entities that are represented.

Network graphs typically include multiple "vertices." A vertex is hereby defined as a computer representation of an entity that forms an element of a network graph (e.g., a person, a building structure, a city/town, a financial transaction, etc.). A vertex typically has one or more "property(ies)," and typically has one or more "meta-property(ies)." The label-ranking calculations described herein may use one or more properties, one or more meta-properties (e.g., "degree," as defined below), or any combination of properties and meta-properties as appropriate for the respective calculation.

A property of a vertex is hereby defined as an attribute of the represented entity. A property is used to store the value of an attribute of the entity represented by the vertex. Some examples of types of properties for represented persons may include: (i) age; (ii) height; (iii) level of education; (iv) income; (v) employer; (vi) parent(s); (vii) siblings; (viii) child(ren); and other factors as appropriate for a given implementation. Some examples of types of properties for represented building structures may include: (i) size; (ii) dimensions; (iii) building materials; (iv) age of structure; (v) property value; (vi) zoning district; (vii) pending zoning actions; and other factors as appropriate for a given implementation. Some examples of types of properties for represented towns/cities may include: (i) population; (ii) demographics; (iii) variations in education levels across residents; (iv) distances to major universities from a town/city center; (v) number of homes in a historic district; (vi) number of parks; (vii) percentage of town/city devoted to parks and recreation for residents; (viii) tax base; (ix) tax rate; and other factors as appropriate for a given implementation.

A meta-property of a vertex is hereby defined as a contextual or computed factor of the vertex (or represented entity) relative to other vertices and/or edges in the graph. A meta-property is information that is not directly attributable to the represented entity (for a vertex) or relationship (for an edge). A meta-property is information that may be calculated from analyzing the vertex/edge within the context of the represented entities, or is information that relates to the way that the data of a vertex/edge was created/curated. Some examples of types of meta-properties for a vertex may include: (i) number of incident edges (degree); (ii) distance from some other identified vertex in the graph; (iii) a measure of the centrality of a vertex (e.g. the "betweenness" of the vertex); (iv) the shortest path from the vertex to some other (known) point in the graph; and other factors as appropriate for a given implementation.

Vertices of a network graph may be interconnected by "edges" within the network graph. An edge is hereby defined as a computer representation of a relationship between entities represented by vertices of a network graph. In view of the different types of elements represented within a network graph, the relationships between the entities a network graph are heterogeneous in nature. Some examples of edges may include: (i) inter-relationships between persons (e.g., parent-child relationships); (ii) inter-relationships between persons and building structures (e.g., persons that live in a dwelling); (iii) inter-relationships between towns/cities (e.g., roads, waterways, etc.); and other inter-relationships as appropriate for a given implementation.

Vertices and edges may be labeled by generation and rendering of a "label" that displays a selected set of properties and/or meta-properties. Some examples of labels may include: (i) name:age; (ii) name:age:education; (iii) name:parent; (iii) city:population; and other combinations of properties and/or meta-properties as appropriate for a given implementation.

The technology described herein operates by, for each vertex of a network graph that includes a set of vertices: determining a meta-property of the vertex relative to other vertices of the set of vertices, determining a distance of the vertex from a user's viewpoint of a three dimensional (3D) rendering of the network graph, and calculating a ranking figure as a function of the determined meta-property in combination with the determined distance. The set of vertices of the network graph is ranked as a function of the respective calculated ranking figures. Labels for a subset of the set of vertices are selectively displayed on a display as a function of the ranking.

Alternatively, a method of displaying a three dimensional rendering of a network graph that includes multiple vertices may include: for each vertex, determining a meta-property for the vertex relative to the other vertices, determining the distance of the vertex from a user's viewpoint of the three dimensional rendering, and, calculating a ranking figure as a function of the inverse of the square of the determined meta-property divided by the square of the determined distance; ranking vertices of the network graph as a function of the corresponding calculated ranking figures; and selectively displaying labels for a subset of the vertices as a function of the ranking.

Accordingly, the problem of improving label rendering computational processing of a very large 3D graph may be solved by determining, according to a selected meta-property for which labels are to be displayed and based upon a rendered orientation of the 3D graph, a distance of each of a plurality of vertices from a viewpoint; and selectively displaying labels for any vertices with data that satisfies the selected meta-property and that are within a configured distance of the viewpoint.

The technology described herein performs a dynamic ranking of vertices by which vertex scores are computed every video frame time on a basis of existing properties or meta-properties of a subset of the vertices to be rendered during the video frame, and on a basis of a relative proximity of each vertex in the subset of vertices to be rendered to the viewer. The vertex scores are utilized to determine, of the subset of vertices that are to be rendered, which of this subset of vertices are to be labeled during the current video frame. As such, vertices that are closer to the viewpoint may not be labeled, while vertices further away may be labeled according to their respective rankings, again based upon the respective properties or meta-properties of the vertices and available real-time processing capabilities of the computing platform. Further, the underlying properties and meta-properties of the vertices themselves may change dynamically over time and across different video frames, and as a result vertices that are labeled may change according to changed rankings.

In view of these technical aspects of the computational processing described herein, the technology described herein differs from conventional technologies in several respects. The technology described herein is directed to determining whether to label individual vertices according to their respective rankings in view of available real-time computing capabilities and performance requirements utilized for label rendering. The technology described herein is not directed to determining where to place labels in rendered output or to rendering all possible labels according to a zoom scale, each as performed in conventional mapping technologies. In further contrast to conventional labeling technologies, because the labels as described herein are derived from the properties or meta-properties of the vertices that may change over consecutive video frames, the rendered labels generated as described herein are distinct from identifiers of represented elements, such as static geographic/location identifiers (e.g., towns, cities, road names, etc.), and are different from categorizations, cluster connotations, or other forms of element identifiers. Further, the distances that are utilized as described herein represent distances of vertices in the subset of vertices to be rendered relative to a viewpoint, and are not index-type distances by which vertices may be traversed and/or accessed relative to one another within a graph.

For purposes of the real-time processing described herein, there is a user controllable viewpoint within the 3D space relative to the 3D model from which the 3D model may be viewed. The view of the 3D model from the viewpoint may be projected by use of graphics libraries onto a 2D image, which may then be displayed on a computer screen. Each vertex of a 3D network graph may be considered to have a defined and potentially variable position in the 3D model of the graph. Additionally, a 3D vector from a position of a vertex to the location of the viewpoint may also be defined and may be considered variable in direction and magnitude.

The magnitude of this 3D vector is the distance of the vertex from the viewpoint. Vertices may move due to dynamic modification of their properties or meta-properties, may move as a result of dynamic revision of the graph layout, may move due to changes in other vertices or edges, or may move due to updates by the dynamic layout algorithm. Further, a user may initiate real-time changes in the position and/or orientation of the viewpoint relative the 3D network graph. As a result of these various factors, the distance from a vertex to the viewpoint may change dynamically. The 3D distance of a vertex from the viewpoint may be used as a measure of proximity of the vertex to the center of attention of the user.

The processing described herein may operate in real time on a display refresh boundary, and may perform computational processing within each display refresh interval to determine which vertices to label or remove labels from for the next display refresh of the network graph output. It is understood that output display devices may update at different refresh rates by which the entire output or a portion of the display may be re-rendered, and changes to the rendered data may be output. Display update rate may be considered by reference to frame rate of video content, where it is recognized that approximately twenty-four (24) frames per second should be displayed to achieve an appearance of fluid motion of moving objects. Example refresh rates of output display devices include twenty four (24) frames per second, thirty (30) frames per second, sixty (60) frames per second, and potentially higher refresh rates as display technology advances.

Similarly, and for purposes of the present description, real time performance of output of a computer display device may be considered according to an amount of time it takes to refresh an entire screen of data. As more data that has changed is designated to be rendered, it will take longer for a computer to perform underlying label determinations and generate output of a full-screen image.

To further detail the introductory description above, the present technology was designed in recognition that a quantity of real-time changes to underlying data of very large three-dimensional (3D) graphs may increase to an extent that computing labels and rendering output data may be limited by computational and output capabilities of the underlying computing platform. The technology described herein manages a number of vertices for which real-time updates of displayed labels are performed according to performance capabilities and real-time performance measurements of the underlying computing platform and proximity of the respective vertices to a user's viewpoint.

It was recognized that unbounded changes to rendering of labels may induce undesirable real-time output affects described above, such as label flickering where labels may turn on and/or off at the respective display refresh rate (e.g., 30 times per second). From a user interface perspective, these types of visual noise may be undesirable.

To avoid flicker of output labels that may otherwise result responsive to the real-time UI or underlying vertex data changes described above, the technology described herein implements "bi-modal" hysteresis. The term bi-modal hysteresis as utilized herein represents a dual-mode or two-mode hysteresis, where decisions to label or remove a label are each individually processed according to independent and configurable hysteresis processing. Accordingly, where a vertex is located at a peripheral distance that may or may not be within the selected subset of labeled vertices for each refresh cycle determination, label flicker may be avoided by implementing a first "on" phase of hysteresis that begins when a label is first displayed to ensure that the label is displayed for a minimum number of refresh cycles or for a minimum time period. Similarly, when a decision is made to no longer display a label, a second "off" phase of hysteresis may be implemented to ensure that the label is not displayed for a minimum number of refresh cycles or for a minimum time. Again, these two modes of the bi-modal hysteresis are independent, and each phase may be configured as appropriate for the given implementation. For example, the first "on" phase and the second "off" phase may be configured for equal amounts of time. Alternatively, either phase may be adjusted according to real-time demands of processing, as appropriate for a given implementation. The terms "bi-model," "dual-mode," and "two-mode" shall be used interchangeably herein with respect to hysteresis processing.

Regarding technical implementation of the subject matter described herein, user interface (UI) selection options may be implemented to allow the user to select between various vertex labeling configurations for computer processing of labels. For example, the user may be able to choose to label all vertices, which may be useful if the graph is small enough or frame rate is not a concern to the particular user at the particular time. Additionally, the user may be able to choose to label a subset of vertices according to a specified proportion, where the proportion provides a fixed real-time processing budget that may be specified/used to label the most interesting or most significant vertices according to the data represented by the vertices. As another alternative, the user may be able to choose to label a subset of vertices according to a specified frame-rate, where the number of labels is varied (e.g., per frame) to sustain the frame rate and used to label the most interesting or most significant vertices according to the data represented by the vertices. Other alternatives are possible for selection of subsets of vertices according to performance-related measures, and all such possibilities are considered within the scope of the present description. The underlying computational processing for calculation and rendering of labels may adapt to the UI selection options as they are changed in real-time, and may adapt to real-time factors associated with calculation of labels according to complexities of the underlying data represented by the respective vertices. Additional CPU/processing budget within a given refresh frame time may be used/configured by UI selection options to render additional labels, or the additional CPU/processing budget may be utilized for other computer processing tasks, as appropriate for a given implementation. Accordingly, the present technology adapts computational processing to the complexities of the underlying data and does so responsively to user interface demands of the user.

The vertices of a 3D graph may be ranked for significance (e.g., data significance) based upon a formula that by default computes an inverse of a square of a degree of a given vertex, divided by a square of a distance of the vertex from the viewer's 2D perspective/position in a rendered 3D space. This formula may be adjusted as appropriate for a given implementation.

These significance measures of the vertices may be interpreted by the computing device as a ranking of the vertices. The "degree" of a vertex may be considered a meta-property of the vertex. As such, the degree or meta-property of a vertex is not a direct property or attribute of the entity modeled by the vertex, but is instead a computed metric that reflects some other (meta) information about the vertex. Other meta-properties or metrics may be used, including (but not limited to) any centrality measures of the vertex, or any statistic related to a vertex relative to some set of all vertices for example. The significance formula may be changed by changing the indices (and hence the effect) of the constituent parts (e.g., distance, degree, or other meta-property) or by introducing different properties or meta-properties of the vertex (e.g., "population" if the type of vertex were "city" or "altitude" if the type of vertex were "mountain"). Many other variations on ranking data significance of vertices are possible, and all such variations are considered within the scope of the technology described herein.

With the individual vertex rankings calculated, the individual vertex rankings may be used to decide on a subset of vertices (if any) that will be labeled in accordance with the proportion or frame rate target or budget, as set by the user interface option(s). The system rendering device/processor may then label as many of the ranked vertices as possible within the specified target or budget.

Regarding implementation variations for the processing described above, the ranked vertices may be distributed across/within a series of bins or buckets. The system may render labels for as many bins as possible, within the constraints of the specified target frame rate or budget.

Additionally, as introduced above with respect to the bi-modal hysteresis, a vertex that has been selected for labeling may continue to be labeled for a specified/configured minimum duration, and a vertex that has been removed from the labeled set may continue to have its label hidden (not be labeled) for a specified/configured minimum duration. These durations may be controllable by parameters associated with the implementation of the algorithm, and may introduce the bi-modal hysteresis to reduce the sudden appearance and disappearance of labels, which may in turn reduce flicker. Vertices that are being displayed as a result of this hysteresis may be selected for display before any vertices from the ranked bins as selected.

By applying the adaptive labeling algorithm to a large network graph, the following outcomes may be achieved. The user may choose to have labels on all objects. The user may choose to label objects in a sparse manner, with emphasis on the vertices (or edges) that are most highly ranked (according to a user selectable set of parameters or properties). The sparseness may be controlled/specified by the user, and may be used to control computational processing to highlight key features of the network graph. The user may choose to label objects to an extent that does not affect the smoothness and responsiveness of the display output. As the user alters the viewpoint into the 3D rendered space, the vertices (or edges) nearest to the center of the user's attention may be emphasized more than vertices (or edges) further from the user's attention, and as a result vertices (or edges) that are very distant from the viewer are less likely to be labeled. Accordingly, many computer performance improvements, output rendering performance improvements, and user interface usability improvements may be achieved by use of the technology described herein.

It should be noted that conception of the present subject matter resulted from recognition of certain limitations associated with performance of computing devices tasked with rendering very large three dimensional (3D) network graphs. For example, it was observed that when displaying a network graph, it is beneficial to be able to display labels to help the user to identify vertices and edges within the network graph. However, it was determined that rendering of labels is expensive in terms of computer performance, and that when displaying a large graph (e.g. consisting of several thousand or more vertices) the performance impact of labeling results in render loop time violations and a reduction in achieved frame rate of the output device. It was determined that these performance impacts adversely affect the smoothness and responsiveness of the display, and lead to jerky and slow display screen updates. It was recognized that there is no known technique that manages the computational processor and display output load incurred by attempting to label the vertices and/or edges of a large network graph. It was also determined that prior strategies for selective labeling (e.g., of maps) would lead to arbitrary results and would generally not display the most advantageous set of labels for the graph. For example, general sampling (e.g., labeling every tenth object) or labeling the most significant objects according to a zoomed perspective (e.g., labeling only cities in a zoomed out perspective of an online mapping application, but then labeling the smaller towns and roads as the user zooms in) do not adequately account for significance of data that is represented by vertices in and by a network graph (e.g., population, altitude, etc.). Further, it was determined that these types of selective labeling strategies would omit display of labels for vertices that include significant data either because the given vertex is not in the sample set (e.g., not a tenth element) or because the given vertex is not at a particular perspective of a zoomed rendering, respectively. The technology described herein solves these recognized problems by adaptively labeling a subset of the vertices (and optionally edges) that are displayed, and extends this adaptive labeling to determining the subset of labels that will be of most interest to the viewer according to the represented data when displaying a three-dimensional (3D) rendering of a network graph irrespective of a zoomed perspective of the network graph. As introduced above, vertices that are closer to the viewpoint may not be labeled, while vertices further away may be labeled according to their respective rankings, again based upon the respective properties or meta-properties of the vertices and available real-time processing capabilities of the computing platform. The present subject matter improves performance of computing devices during real-time rendering of 3D network graphs by providing adaptive labeling of network graphs, as described above and in more detail below. As such, improved computer performance may be obtained through use of the present technology.

Computation of a vertex score may be performed in a variety of manners, as appropriate for a given implementation. The following portion of the present description provides several alternatives for computation of a vertex score. It is understood that any of these variations may be utilized as appropriate for a given implementation.

The vertex score may be calculated as a function of the determined meta-property in combination with the determined distance. Several options are available for calculating a vertex score. For example, the vertex score may be calculated as a square of the chosen meta-property value of the respective vertex divided by a square of the determined distance of the vertex from the user's viewpoint of the three dimensional (3D) rendering of the network graph. Within this example, the higher-scoring vertices may be considered to be higher ranking for purposes of label generation. Alternatively, and as an inverse to the option described above, the vertex score may be calculated as a square of the determined distance of the vertex from the user's viewpoint of the three dimensional (3D) rendering of the network graph divided by a square of the chosen meta-property value of the respective vertex. Within this example, the lower-scoring vertices may be considered to be higher ranking for purposes of label generation. It is understood that a value of one (1) may be added to the respective distance value or the respective chosen meta-property value to avoid division by zero (0). Other techniques for calculating a vertex score that reflects importance of the vertex in association with its distance from the viewpoint may be used, as appropriate for a given implementation. For example, a linear value, a square value, a cube value, or other modification of either the numerator or denominator may be utilized. However, it has been determined that use of a square of the distance and a square of meta-property delivered a visually stable resulting output. The vertex score, as calculated in a manner appropriate for a given implementation, may be considered a ranking figure by which to rank the selected vertex among other vertices, as described above and in more detail below.

The following pseudo syntax examples utilize a set of abbreviations. First, "val" is "vertices already labeled" and contains a set of vertices that are in positive hysteresis, such that display of labels is continued. Next, "vtl" is "vertices to label" and contains the ranked candidate vertices that will be labeled if there is sufficient real-time processing capacity to label these candidate vertices. Vertices that are in negative hysteresis are in a "held_out" virtual set that is not materialized as a concrete set, but for which a count of vertices in the held out state is maintained as "vertices_held_out."

The following pseudo syntax segments illustrate examples of possible implementations of certain technical details of the processing described herein. The following first example pseudo syntax represents an early portion of per-frame processing, where the vertices may be sorted into sets, and bi-modal hysteresis may be applied to the vertices. Comments within this example pseudo syntax and the syntax itself provide the description of this example, and line numbers are provided in parentheses in the far left column. Within this example, there is a variable "hysteresis" associated with each vertex. The value of hysteresis is set to a configured maximum value when a vertex is first labeled or renewed for relabeling, and the value of hysteresis is decremented at each frame cycle.

First Example Pseudo Syntax

```
(1)   // Vertices may be in one of three (3) states:
(2)   // * labeled and hysteresis > threshold (HYST_THR)
      (display label),
(3)   // * labeled and hysteresis between THR and minimum
      (HYST_MIN) (ignored)
(4)   // * or not labeled (add to wait list)
(5)   if (hysteresis > labeller.HYST_THR) {   // vertex is in
      hysteresis and labeled
(6)       var val_entry = { };
(7)       val_entry.vid = vertex.id;
(8)       val_entry.hyst = hysteresis;
(9)       val.push(val_entry);
(10)  }
(11)  else if (hysteresis < labeller.HYST_THR && hysteresis >
      labeller.HYST_MIN) {
(12)      // Vertex is held out - does not get considered for
          relabeling until HYST_MIN
(13)      // is reached
(14)      labeller.vertices_held_out = labeller.vertices_held_out+1;
(15)  }
(16)  else { // THIS IS THE DECISION POINT WHERE THE
      VERTEX GETS A
(17)      // CHANCE TO RENEW ITS LABEL BEFORE BEING
          HIDDEN
(18)      // hyst is exactly THR or has reached MIN: add vertex
          to list of those waiting
(19)      // to be labeled
(20)      // This case of hyst equal THR provides a chance for the
          vertex to remain
```

```
(21)            // displayed based on its significance, avoiding going
                into hold out state.
(22)            var vtl_entry = { };
(23)            vtl_entry.vid = vertex.id;
(24)            vtl_entry.distance = sig;
(25)            vtl_entry.hyst = hysteresis;
(26)            vtl.push(vtl_entry);
(27)        }
```

Within the first example pseudo syntax, values of "HYST_MAX," "HYST_THR," and "HYST_MIN" may be set to any values appropriate for a given implementation. Example values for these variables may be HYST_MAX=10, HYST_THR=5, and HYST_MIN=0. Settings selected at these values would have an effect of displaying each label for a minimum of 5 frames (e.g., 10–5), and hiding each label for a minimum of 5 frames (e.g., 5–0). As such, this variation would provide symmetric bi-modal hysteresis because labels would be guaranteed to be displayed and hidden for equal numbers of frame counts. Alternatively, the bi-modal hysteresis may be implemented to be non-symmetrical by adjusting the values of the maximum and threshold hysteresis settings (e.g. HYST_MAX=12, HYST_THR=5, or otherwise as appropriate for a given implementation).

The following second example pseudo syntax may be performed later in the per-frame processing. This second example pseudo syntax illustrates processing for an adaptive mode of label display in which labels of edges may also be displayed. It should be noted that the technology described herein additionally allows a user, under user control, to enable a "neighborhood" labeling mode. Under the neighboring labeling mode, if a vertex is labeled, then its adjacent edges and immediate neighbor vertices are also labeled. This neighboring labeling mode provides additional context within which the original subject vertex may be viewed or interpreted. In adaptive labeling mode, the immediate neighbor vertices are not automatically labeled because they are subject to the adaptive labeling algorithm, as described. However, each adjacent edge of a vertex may be labeled if labeling is enabled for the type of that edge. The following second example pseudo syntax also illustrates "bucketized" processing of vertices to improve real-time performance. Again, comments within this example pseudo syntax and the syntax itself provide the description of this example, and line numbers are provided in parentheses in the far left column.

Second Example Pseudo Syntax

```
(1)     // Display labels for VAL set
(2)     for (var v=0; v<this.vertices_already_labelled.length; v++) {
(3)         var vtx_id = this.vertices_already_labelled[v].vid;
(4)         var vertex = this.graph.getVertexById(vtx_id);
(5)
(6)         // Get the label for the target vertex
(7)         var vtxLabel = null;
(8)         vtxLabel = this.vertexLabel(vertex, this.graph);
(9)         if (vtxLabel !== null) {
(10)            this._DisplayVertexLabel(vertex, vtxLabel, ctx);
(11)
(12)            // In adaptive mode, label visible incident edges (only) if
                labeling
(13)            // is enabled
(14)            this._displayVertexEdgeLabels(vertex, ctx);
(15)        }
(16)    }
(17)
(18)    // Display labels for as many candidate (ranked) vertices as
        possible, up to the last
(19)    // bucket, referred to by "lb," calculated earlier in the processing
(20)    if (this.labeller_vbuckets.length > 0 ){
(21)        for (var b=0; b<=lb; b++) {
(22)            var bkt = this.labeller_vbuckets[b];
(23)            for (var j=0; j<bkt.length; j++) {
(24)                var vtx_id = bkt[j];
(25)                var vertex = this.graph.getVertexById(vtx_id);
(26)
(27)                var mdl =
                    this._getOrCreateLabellerMetadata(vertex);
(28)                // Reset hysteresis to max when vertex is first
                    displayed
(29)                // Min #frames to show label is HYST_MAX –
                    HYST_THR
(30)                // THE FOLLOWING IS WHERE THE
                    HYSTERESIS
(31)                // RESETS TO HYST_MAX
(32)                mdl.hyst = this.HYST_MAX;
(33)
(34)                var vtxLabel = null;
(35)                vtxLabel = this.vertexLabel(vertex, this.graph);
(36)                if (vtxLabel !== null) {
(37)                    this._DisplayVertexLabel(vertex,
                        vtxLabel, ctx);
(38)
(39)                    // In adaptive mode perform a subset of
                        neighborhood
(40)                    // mode, labeling visible only the incident
                        edges that
(41)                    // have labeling enabled (and not
                        neighboring vertices)
(42)                    this._displayVertexEdgeLabels(vertex,
                        ctx);
(43)                }
(44)            }
(45)        }
(46)
(47)        // Manage the hysteresis for vertices in this bucket
(48)        for (var b=lb+1; b<this.labeller_num_buckets-1 ; b++) {
(49)            var bkt = this.labeller_vbuckets[b];
(50)            for (var j=0; j<bkt.length; j++) {
(51)                var vtx_id = bkt[j];
(52)                var vertex = this.graph.getVertexById(vtx_id);
(53)                var mdl =
                    this._getOrCreateLabellerMetadata(vertex);
(54)
(55)                if (mdl.hyst == this.HYST_THR) {
(56)                    // Set random backoff timer here by
                        selecting random
(57)                    // fraction of THR. Vertex ranking will
                        decrement
(58)                    // hysteresis until it reaches MIN
(59)                    mdl.hyst = Math.random( ) *
                        this.HYST_THR;
(60)                    mdl.hyst = Math.floor(mdl.hyst);
(61)                }
(62)                else if (mdl.hyst == this.HYST_MIN) {
(63)                    // ignore the vertex. It is out of hysteresis
                        but was not
(64)                    // chosen due to insufficient significance
(65)                }
(66)            }
(67)        }
(68) }
```

It may be noted that within the second example pseudo syntax above each label is provided with a slightly randomized period in the negative phase of the bi-modal hysteresis relative to a hysteresis threshold value (HTHR) (e.g., within the range HTHR>count>0). Randomizing the negative phase of the bi-modal hysteresis may be utilized to avoid introducing pulsating effects as numbers of labels are reintroduced in the same frame.

The adaptive labeling of network graphs described herein may be performed in real time to allow improved computing device performance during updating of network graphs. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for adaptive labeling of network graphs. A computing device_1 102 through a computing device_N 104 communicate via a network 106 with several other devices. The other devices include a server_1 108 through a server_M 110, and a database 112. Each of the server_1 108 through the server_M 110 and the database 112 may provide for storage and retrieval of network graphs within the system 100. Each of these devices may be considered a "computing platform" for ease of reference and description herein.

As will be described in more detail below in association with FIG. 2 through FIG. 4B, the computing device_1 102 through the computing device_N 104 may each provide automated adaptive labeling of network graphs. The server_1 108 through the server_M 110 may also provide automated adaptive labeling of network graphs. The automated adaptive labeling of network graphs is based upon real-time evaluation of computer performance of a computing platform in response to user interface (UI) changes of orientation (e.g., zooming, scrolling, etc.) and in response to changes of underlying data and meta-properties of vertices of network graphs. The adaptive labeling of network graphs selectively renders labels (and optionally edges) of network graphs according to performance capabilities of the underlying monitored computing platform that is rendering the network graph. The adaptive labeling of network graphs may improve the real-time performance of the computing platform without degradation of and while enhancing the user interface experience and usability. The present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data (e.g., network graphs and/or data of vertices of a network graph) for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 2:
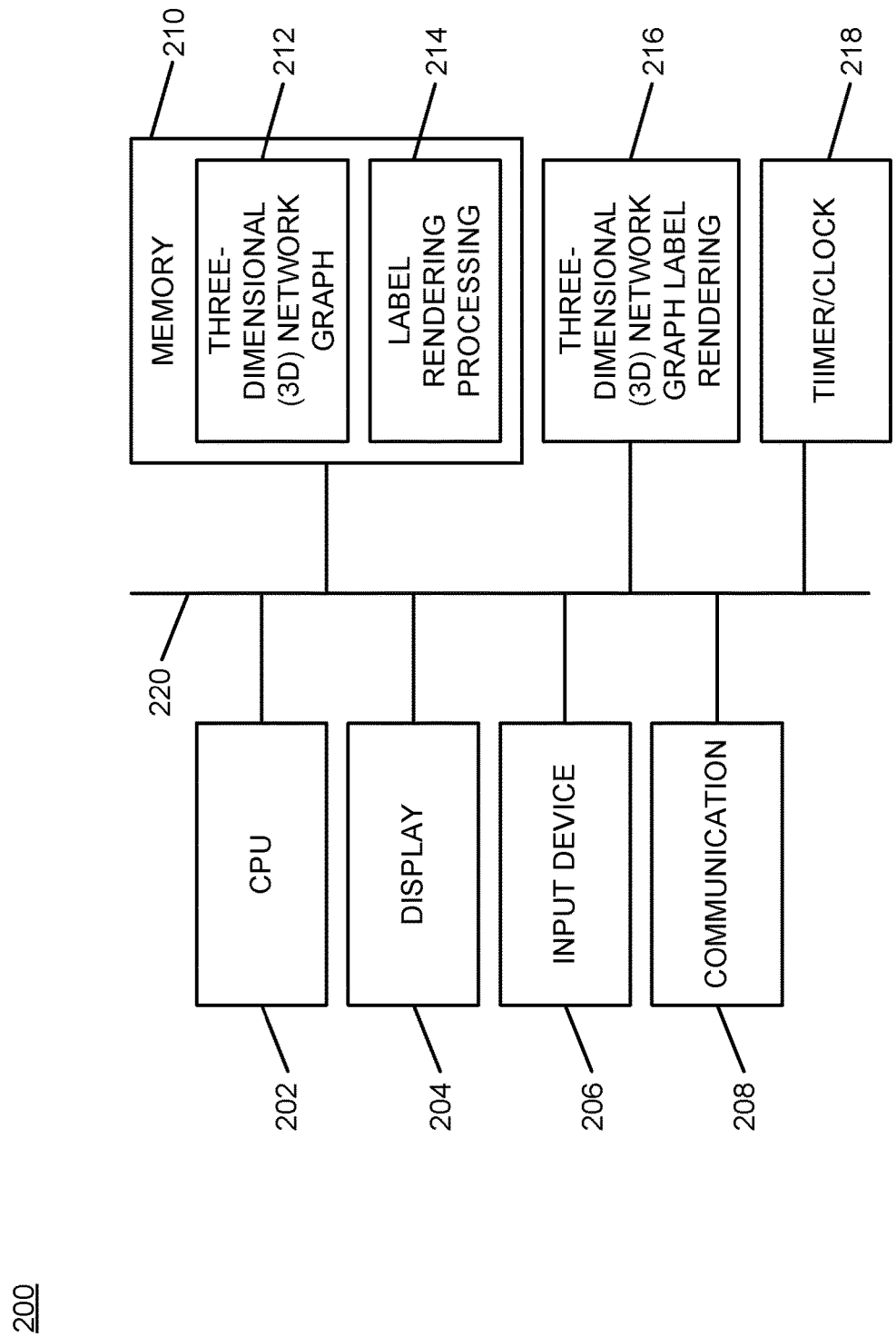
FIG. 2 is a block diagram of an example of an implementation of a core processing module capable of performing adaptive labeling of network graphs according to an embodiment of the present subject matter.

FIG. 2 is a block diagram of an example of an implementation of a core processing module 200 capable of performing adaptive labeling of network graphs. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

The core processing module 200 may provide different and complementary processing for network graph rendering and computing device performance improvements in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a three-dimensional (3D) network graph storage area 212 that stores network graphs for processing and display in association with the core processing module 200. The memory 210 also includes a label rendering processing storage area 214 that provides computational processing space for calculation of distances, bi-modal hysteresis processing, label calculation from vertex meta-properties, and other computational processing as appropriate for a given implementation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A three-dimensional (3D) network graph label rendering module 216 is also illustrated. The 3D network graph label rendering module 216 provides computational processing for measurement of real-time display output performance in conjunction with label rendering and for adjustment/adaptation of label rendering by the core processing module 200, as described above and in more detail below. The 3D network graph label rendering module 216 implements the automated adaptive labeling of network graphs of the core processing module 200.

It should also be noted that the 3D network graph label rendering module 216 may form a portion of other circuitry described without departure from the scope of the present subject matter. The 3D network graph label rendering module 216 may form a portion of an interrupt service routine (ISR), a portion of an operating system, or a portion of an application without departure from the scope of the present subject matter. The 3D network graph label rendering module 216 may also include an embedded device with circuitry designed specifically to perform the processing described herein as appropriate for a given implementation.

A timer/clock module 218 is illustrated and used to determine timing (and date) information, such as display refresh timing and label rendering process timing, as described above and in more detail below. As such, the 3D network graph label rendering module 216 may utilize information derived from the timer/clock module 216 for information processing activities, such as the adaptive labeling of network graphs.

The CPU 202, the display 204, the input device 206, the communication module 208, the memory 210, the 3D network graph label rendering module 216, and the timer/clock module 218 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. Accordingly, the core processing module 200 may take many forms and may be associated with many platforms.

Figure 3:
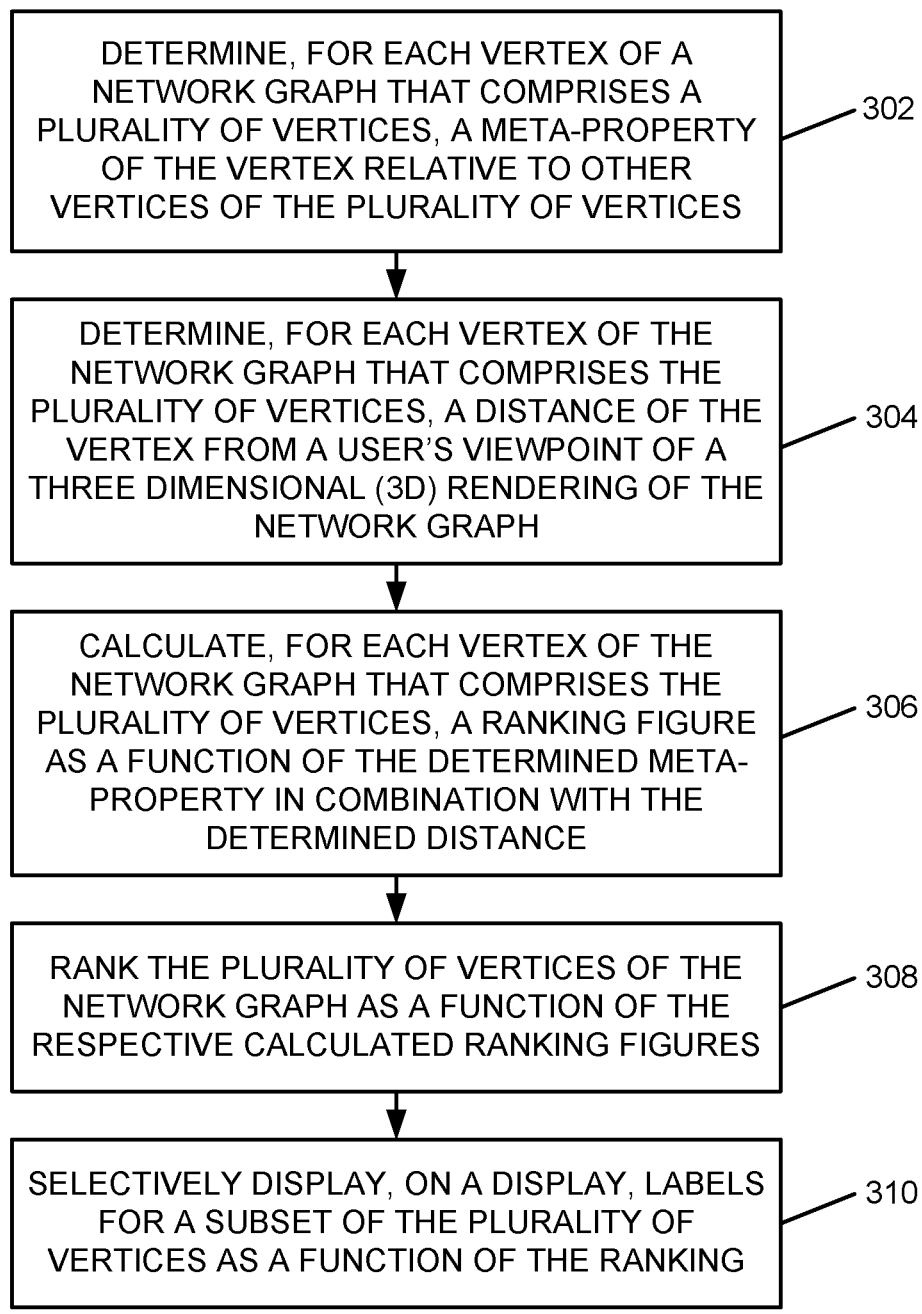
FIG. 3 is a flow chart of an example of an implementation of a process for adaptive labeling of network graphs according to an embodiment of the present subject matter.
Figure 4A:
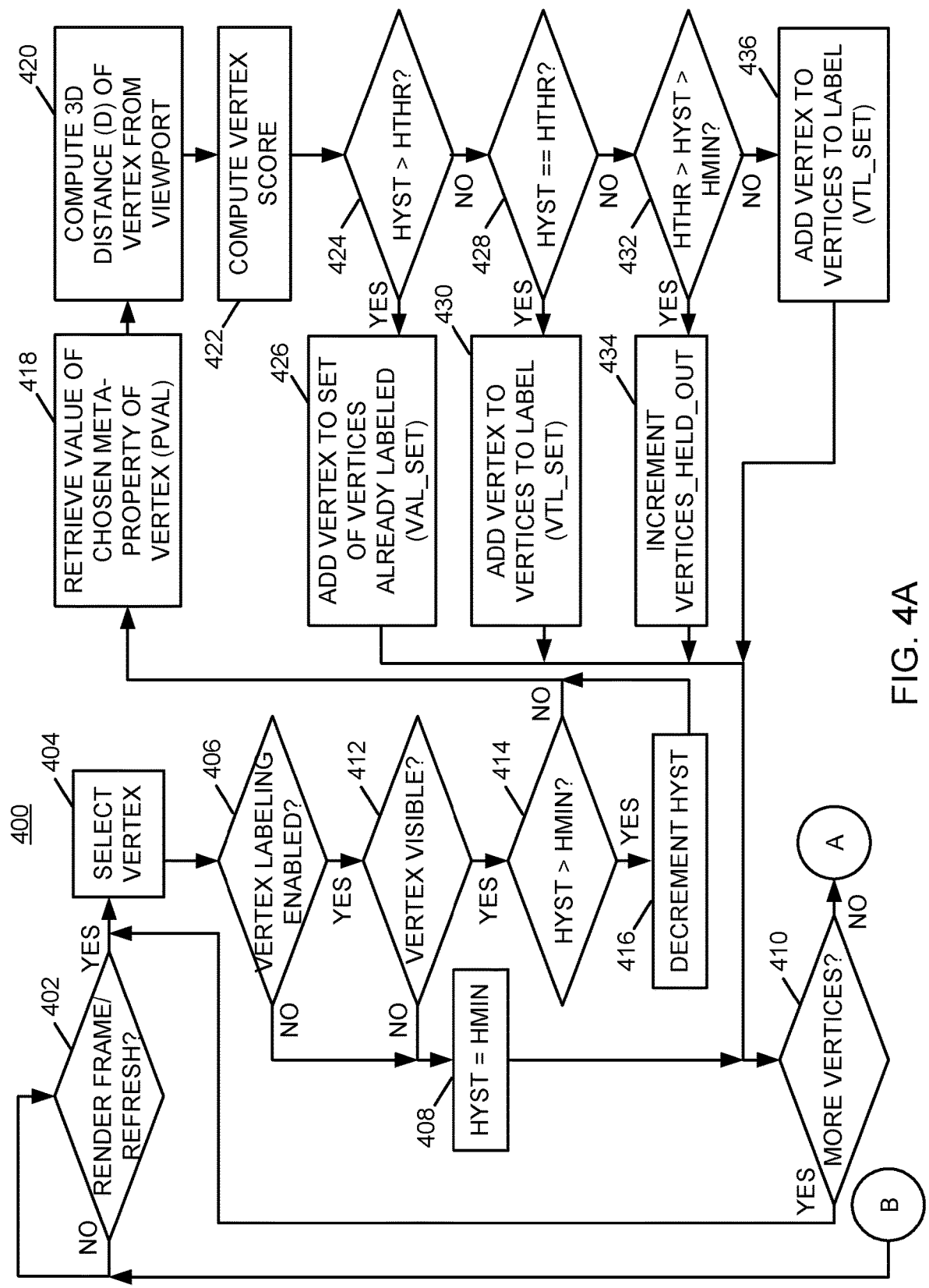
FIG. 4A is a flow chart of an example of an implementation of initial processing within a process for iterative real-time adaptive labeling of network graphs to iteratively rank individual vertices according to meta-properties that have been selected for labeling according to an embodiment of the present subject matter.
Figure 4B:
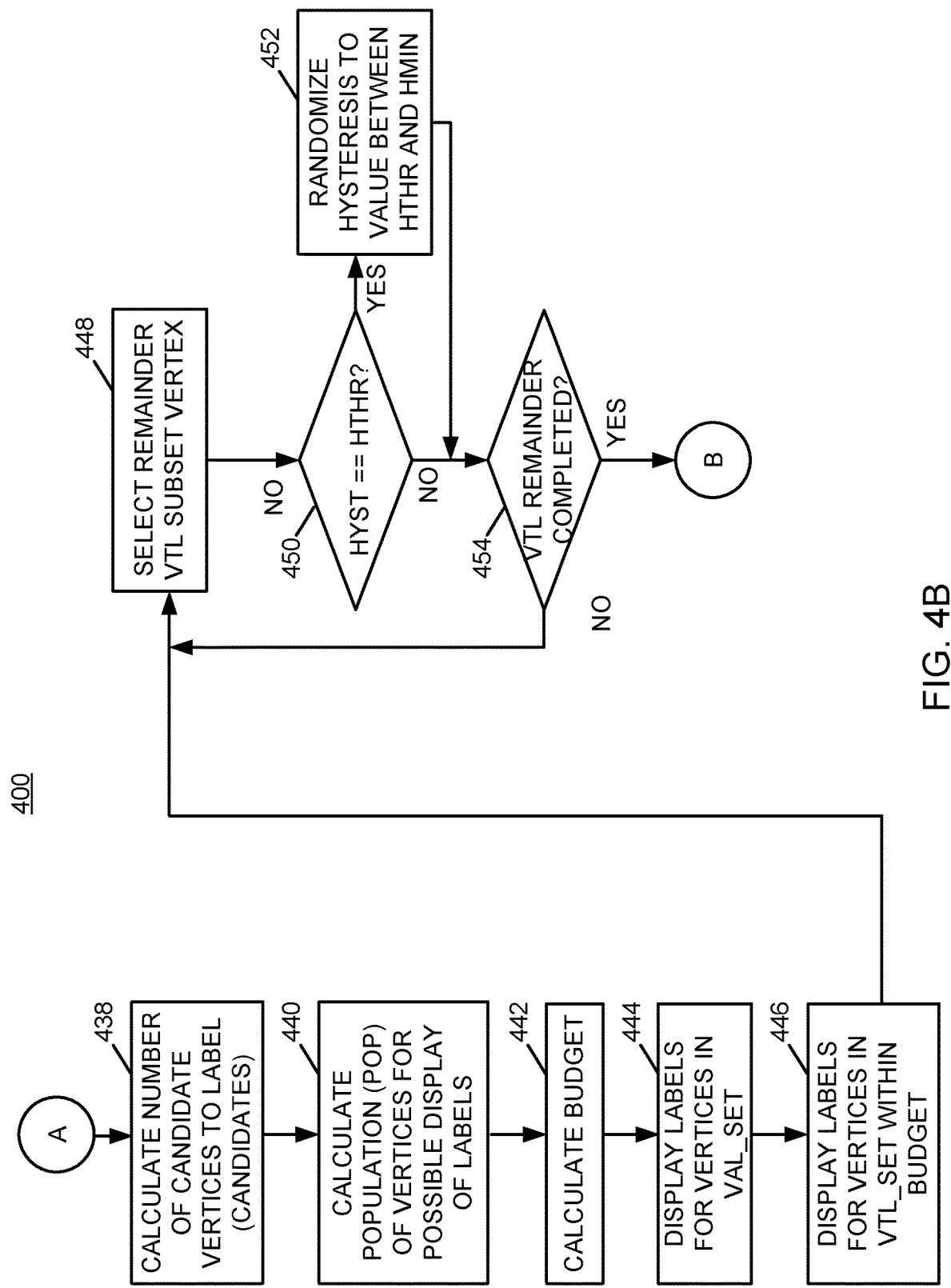
FIG. 4B is a flow chart of an example of an implementation additional processing within a process for iterative real-time adaptive labeling of network graphs to select which ranked vertices to label, and to calculate and render labels for selected vertices according to an embodiment of the present subject matter.

FIG. 3 through FIG. 4B described below represent example processes that may be executed by devices, such as the core processing module 200, to perform the automated adaptive labeling of network graphs associated with the present subject matter. Many other variations on the example processes are possible and all are considered within the scope of the present subject matter. The example processes may be performed by modules, such as the 3D network graph label rendering module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for adaptive labeling of network graphs. The process 300 represents a computer-implemented method of performing the subject matter described herein. At block 302, the process 300 determines, for each vertex of a network graph that comprises a plurality of vertices, a meta-property of the vertex relative to other vertices of the plurality of vertices. At block 304, the process 300 determines, for each vertex of the network graph that comprises the plurality of vertices, a distance of the vertex from a user's viewpoint of a three dimensional (3D) rendering of the network graph. At block 306, the process 300 calculates, for each vertex of the network graph that comprises the plurality of vertices, a ranking figure as a function of the determined meta-property in combination with the determined distance. At block 308, the process 300 ranks the plurality of vertices of the network graph as a function of the respective calculated ranking figures. At block 310, the process 300 selectively displays, on a display, labels for a subset of the plurality of vertices as a function of the ranking.

FIGS. 4A-4B illustrate a flow chart of an example of an implementation of process 400 for iterative real-time adaptive labeling of network graphs. The process 400 represents a computer-implemented method of performing the subject matter described herein. FIG. 4A illustrates initial processing within the process 400 to iteratively rank individual vertices of a set of vertices according to meta-properties that have been selected for labeling. FIG. 4B illustrates processing for selection of which ranked vertices to label, and for calculation and rendering of labels for selected vertices. The processing described in association with the process 400 occurs during each frame refresh period/cycle of an output display device that is tasked with rendering labels for large 3D network graphs.

With reference to FIG. 4A and decision point 402, the process 400 begins iterative real-time processing, and makes a determination as to whether to render a display frame output of a network graph, which may occur at a display refresh real-time boundary or interval, or other real-time event as appropriate for a given implementation. As described above, example display refresh periods may include twenty four (24) frames per second, thirty (30) frames per second, or other display refresh rate as appropriate for a given implementation.

It is understood that the data represented by vertices within a network graph may change in real-time and between display refresh periods/intervals. As will be described in more detail below, the process 400 dynamically updates which of the set of vertices form a subset of the set of vertices for which labels are selectively displayed responsive to real-time changes of the meta-properties of the vertices that result from real-time changes in data represented by the respective vertices within the network graph.

In response to determining at decision point 402 to render a display frame output of a network graph, the process 400 begins iterative processing to determine which vertices of the network graph to label, and selects a first vertex of the network graph at block 404. At decision point 406, the process 400 makes a determination as to whether vertex labeling is enabled for the selected vertex. Affirmative processing responsive to the determination at decision point 406 will be described further below to initially describe the iterative per-vertex processing cycle of the process 400.

In response to determining that vertex labeling is not enabled for the selected vertex, the process 400 sets a hysteresis data variable (HYST) that controls processing of the selected vertex to a configured minimum hysteresis value (HMIN) at block 408. The process 400 makes a determination at decision point 410 as to whether any additional vertices of the network graph exist to be processed. Affirmative processing responsive to the determination at decision point 410 will be described further below to initially describe the iterative per-vertex processing cycle of the process 400.

In response to determining at decision point 410 that at least one additional vertex of the network graph exist to be processed, the process 400 returns to block 404 and selects the next vertex. The process 400 iteratively processes each vertex of the network graph as described above and as described in more detail below.

Returning to the description of decision point 406 and processing responsive to an affirmative determination, in response to determining at decision point 406 that vertex labeling is enabled for the selected vertex, the process 400 makes a determination at decision point 412 as to whether the selected vertex of the network graph is currently visible within the area of the display. As such, the process 400 may improve efficiency by discontinuing processing efforts for vertices that are outside of a visible area of the rendered display output. In response to determining at decision point 412 that the selected vertex of the network graph is not currently visible within the area of the display, the process 400 returns to block 408 and sets the hysteresis data variable (HYST) that controls processing of the selected vertex to the configured minimum hysteresis value (HMIN). The process 400 iterates as described above.

Alternatively, in response to determining at decision point 412 that the selected vertex of the network graph is currently visible within the area of the display, the process 400 makes a determination at decision point 414 as to whether the hysteresis data variable (HYST) that controls processing of the selected vertex greater than the minimum hysteresis value (HMIN). As described in detail further above, the process 400 may establish, as bi-modal display output hysteresis, a first hysteresis phase that defines a minimum display time for displaying the labels for the subset of the set of vertices responsive to the labels being displayed, and a second hysteresis phase that defines a minimum time for not displaying the labels for any of the subset of the set of vertices responsive to the display of the labels being stopped. The processing at decision point 412 and other decision points described below implement this bi-modal hysteresis, and the bi-modal hysteresis may reduce real-time label display flicker responsive to real-time changes of the meta-properties of the vertices according to the bi-modal display output hysteresis.

In response to determining at decision point 414 that the hysteresis data variable (HYST) that controls processing of the selected vertex is greater than the configured minimum hysteresis value (HMIN), the process 400 decrements the hysteresis data variable (HYST) at block 416. Alternatively, in response to determining that the hysteresis data variable (HYST) that controls processing of the selected vertex is not greater than (e.g., less than or equal to) the minimum hysteresis value (HMIN) at decision point 414, or in response to decrementing the hysteresis data variable (HYST) at block 416, the process 400 retrieves a value (PVAL) of a chosen meta-property of the selected vertex at block 418. As described above, meta-properties are computed metrics that reflect (meta) information about the vertex, and any appropriate meta-property may be chosen for use in calculation of labels for vertices. As such, the process 400 retrieves the specified/chosen meta-property of the vertex for further processing. It is understand that more than one meta-property may be chosen for use in label calculations and processing, as appropriate for a given implementation.

At block 420, the process 400 computes a three-dimensional (3D) distance (D) of the vertex from current 3D coordinates of the viewpoint, as defined above. This distance as computed may be used in the computation of a vertex score.

At block 422, the process 400 computes a vertex score of the selected vertex. The vertex score may be calculated as a square of the chosen meta-property value (PVAL) of the respective vertex divided by a square of the determined distance (D) of the vertex from the user's viewpoint of the three dimensional (3D) rendering of the network graph (e.g., ranking/score=(PVAL*PVAL)/(D*D)). It is understood that a value of one (1) may be added to the distance value to avoid division by zero (0). Other techniques for calculating a vertex score that reflects importance of the vertex in association with its distance from the viewpoint may be used, as appropriate for a given implementation. For example, a linear value, a square value, a cube value, or other modification of either the numerator or denominator may be utilized. However, it has been determined that use of a square of the distance and a square of meta-property delivered a visually stable resulting output. The vertex score, as calculated in a manner appropriate for a given implementation, may be considered a ranking figure by which to rank the selected vertex among other vertices, as described above and in more detail below.

It is understood that the data and meta-properties represented by individual vertices of a network graph, and the orientation and scale (e.g., zoom, etc.) requested for display by the user may change across frame refresh period/cycle boundaries. As such, the process 400 may iteratively update the determined distance, the calculated ranking figure, and the ranking of the vertices of the network graph responsive to at least one user input instructing a change of the 3D rendering of the network graph and any changes to the underlying data or meta-properties of the network graph, and the process 400 may selectively display labels for an updated subset of the set of vertices as a function of the updated ranking on a display.

At decision point 424, the process 400 begins hysteresis processing and makes a determination as to whether the hysteresis data variable (HYST) is greater than a hysteresis threshold value (HTHR) that controls vertex labeling. In response to determining that the hysteresis data variable (HYST) is greater than the hysteresis threshold value (HTHR) (e.g., that the vertex is already labeled), the process 400 adds the selected vertex to a set of vertices that are already labeled (VAL_SET) at block 426, and the process 400 returns to decision point 410 and iterates as described above.

Alternatively, in response to determining at decision point 424 that the hysteresis data variable (HYST) is not greater than the hysteresis threshold value (HTHR) that controls vertex labeling, the process 400 makes a determination at decision point 428 as to whether the hysteresis data variable (HYST) is equal to the hysteresis threshold value (HTHR). Where hysteresis data variable (HYST) is equal to the hysteresis threshold value (HTHR), the vertex gets a chance to renew its label before being hidden, and the vertex may be labeled based upon its score/ranking relative to other vertices. As such, in response to determining that the hysteresis data variable (HYST) is equal to the hysteresis threshold value (HTHR), the process 400 adds the vertex to the set of vertices to label (VTL_SET) at block 430, and the process 400 returns to decision point 410 and iterates as described above. Additional processing will be described further below to determine which vertices of the set of vertices to label (VTL_SET) will actually be labeled during any given display refresh period.

Alternatively, in response to determining at decision point 428 that the hysteresis data variable (HYST) is not equal to the hysteresis threshold value (HTHR), the process 400 makes a determination at decision point 432 as to whether the hysteresis data variable (HYST) is between to the hysteresis threshold value (HTHR) and the configured minimum hysteresis value (HMIN). In this state of hysteresis, the selected vertex is not labeled, and is maintained in a not labeled state to avoid label flicker. In response to determining that the hysteresis data variable (HYST) is between to the hysteresis threshold value (HTHR) and the configured minimum hysteresis value (HMIN), the process 400 increments the vertices held out processing counter (vertices_held_out) at block 434, and the process 400 returns to decision point 410 and iterates as described above.

As a final alternative in the hysteresis processing section, in response to determining at decision point 432 that the hysteresis data variable (HYST) is not between to the hysteresis threshold value (HTHR) and the configured minimum hysteresis value (HMIN) (e.g., that the hysteresis equals the hysteresis minimum, HYST==HMIN), the process 400 adds the vertex to the set of vertices to label (VTL_SET) at block 436. As such, in response to the non-labeled hysteresis phase (e.g., negative hysteresis) being completed, the vertex also gets a chance to renew its label because the vertex label has been hidden long enough to satisfy the negative hysteresis setting, and the vertex may be labeled based upon its score/ranking relative to other vertices. The process 400 again returns to decision point 410 and iterates as described above Returning to the description of decision point 410 and processing responsive to an affirmative determination, in response to determining at decision point 410 that no additional vertices of the network graph exist to be processed (e.g., that all vertices have been initially processed), the process 400 transitions to the processing shown and described in association with FIG. 4B as represented by the circled letter "A" in FIG. 4A and FIG. 4B.

FIG. 4B illustrates additional processing associated with the process 400 for iterative real-time adaptive labeling of network graphs, and includes additional processing to select which ranked vertices to label, and to calculate and render labels for selected vertices. At block 438, the process 400 begins processing for selection of which ranked vertices to label, and for calculation and rendering of labels for selected vertices by calculating a number of candidate vertices to label (CANDIDATES). For purposes of example, the number of candidate vertices to label may be calculated as the set of vertices already labeled (VAL_SET) plus the set of vertices to label (VTL_SET) (e.g., VAL_SET+VTL_SET). The number of candidate vertices to label may further be based upon a current number of vertices of the network graph that are within a viewable area of a display and distance from the viewpoint, may be based upon real-time processing requirements for calculation and display of vertices, or may be based upon other factors as appropriate for a given implementation.

At block 440, the process 400 calculates a population of vertices for possible display. For purposes of example, the calculated population (POP) of vertices for possible display may be calculated as the calculated number of candidates (CANDIDATES) multiplied by a configurable proportion (PROP), where the configurable proportion may be dynamically adjusted and smoothed over time based upon an achieved display frame rate versus a target frame rate.

At block 442, the process 400 calculates a display budget for display of vertex labels. For purposes of example, the calculated display budget may be calculated as the population (POP) number minus the number of vertices in the set of vertices already labelled (VAL_SET) (e.g., POP−VTL_SET). As such, the process 400 may dynamically adjust a proportion (e.g., quantity) of vertices for which the labels are selectively displayed according to a configured real-time computational performance criterion for display update processing. It should be noted that for purposes of implementation, quantization buckets may be utilized and the budget may be distributed across a set of quantization buckets that each include sets of vertices for which labels may be displayed, and the calculated budget may be the number of quantization buckets of vertices for which to display labels.

At block 444, the process 400 displays labels for vertices in the set of vertices already labelled (VAL_SET). Because these vertices are already labelled, processing may be improved by displaying these labels first because they are known to satisfy hysteresis requirements and real-time processing may be reduced.

At block 446, the process 400 displays labels for vertices in the set of vertices to label (VTL_SET). As each vertex in the set of vertices to label is labelled at block 446, the process 400 may also set the hysteresis data variable (HYST) that controls processing of the respective vertex to a configured maximum hysteresis value (HMAX) to begin hysteresis processing of the respective vertex with the first frame time during which the label for the vertex is displayed. The process 400 may also label the incident edges of each labelled vertex at block 446, as appropriate for a given implementation. The processing at block 446 may continue up to a configured amount of time budget for display of new labels during the current frame rendering period and the related processing.

It should be noted that the process 400 may tune its processing for rendering of labels across iterative frame times relative to an achieved frame rate to either increase or decrease a quantity of vertices for which labels are rendered. The process 400 may monitor an achieved real-time computational performance of display update processing relative to a threshold real-time computational performance criterion for display update processing. The threshold real-time computational performance criterion for display update processing may include an amount of time consumed to calculate and/or refresh labels that are rendered, a number of processor clock cycles consumed to calculate and/or refresh labels that are rendered, or other criteria by which performance may be measured. In response to the monitoring, the process 400 may increase a proportion (e.g., quantity) of vertices for which the labels are selectively displayed until the achieved real-time computational performance approximates the threshold real-time computational performance criterion (e.g., budget) responsive to determining that real-time computational performance exceeds a threshold real-time computational performance criterion (e.g., budget). Any vertices for which labels were not rendered may have a chance to be labelled in the next frame period and iteration of the process 400. Consistent with the description above, the process 400 may reduce the proportion (e.g., quantity) of the vertices for which the labels are selectively displayed until the achieved real-time computational performance approximates the threshold real-time computational performance criterion. Any vertices for which labels were rendered that caused the frame budget and performance to be excessively reduced may be removed from labeling in a subsequent frame period during which their respective hysteresis count values have reached the configured minimum hysteresis value (HMIN), as the process 400 iterates.

The process 400 begins iterative processing of individual vertices in the subset of remaining vertices to label to randomize the remaining hysteresis for label display of this subset to avoid coincident changes in label rendering. At block 448, the process 400 selects a vertex from the subset of remaining vertices to label. At decision point 450, the process 400 makes a determination as to whether the hysteresis data variable (HYST) that controls processing of the selected vertex equals the configured hysteresis threshold value (HTHR). In response to determining that the hysteresis data variable (HYST) that controls processing of the selected vertex equals the configured hysteresis threshold value (HTHR), the process randomizes the hysteresis data variable (HYST) of the selected vertex to a value between the hysteresis threshold value (HTHR) and configured minimum hysteresis value (HMIN) at block 452. In response to completion of the randomization of the hysteresis data variable (HYST) of the selected vertex at block 452, or in response to determining at decision point 450 that the hysteresis data variable (HYST) that controls processing of the selected vertex does not equal the configured hysteresis threshold value (HTHR), the process 400 makes a determination at decision point 454 as to whether processing to randomize the individual vertices in the subset of remaining vertices to label has been completed. In response to determining that the processing to randomize the individual vertices in the subset of remaining vertices to label has not been completed, the process 400 returns to block 448 and selects the next remaining vertex. Alternatively, in response to determining that the processing to randomize the individual vertices in the subset of remaining vertices to label has been completed, the process 400 transitions and returns to the processing shown and described in association with FIG. 4A at decision point 402, as represented by the circled letter "B" in FIG. 4B and FIG. 4A.

As such, the process 400 illustrates processing to rank individual vertices of network graphs for label display based upon chosen meta-properties (e.g., data significance) of the respective vertices and a 3D distance of the vertices from a viewpoint of the 3D graph. The process 400 performs bi-modal hysteresis processing to manage display and non-display of labels for the vertices. The process 400 iteratively updates the determined distance, the calculated ranking figure, and the ranking of the vertices of the network graph responsive to one or more user inputs instructing a change of the 3D rendering of the network graph and any changes to the underlying data or meta-properties of the network graph. The process 400 selectively displays labels on a display for an updated subset of the set of vertices as a function of the updated ranking. The process 400 further manages real-time label rendering budget during display frame refresh periods to display additional labels for candidate vertices, and randomizes the hysteresis of any candidate vertices that did not get labeled to improve both real-time processing of label rendering and to reduce label flicker affects that may otherwise occur if multiple labels were caused to be rendered or not rendered during individual frame refresh periods.

Some embodiments of the present invention may improve the technology of computers in one, or more, of the following ways: (i) reducing/preventing label rendering loop timing violations relative to display refresh time intervals; (ii) improving achieved display rendering frame rate for label rendering of network graphs; (iii) increasing speed of display update processing; (iv) reducing/preventing stuttered/jerky display updates; (v) reducing computations required to select labels to render; (vi) improving rendered output by reducing browser label overload and clutter; and (vii) improving user interface output processing.

The present invention is not abstract because it relates particularly to computer operations and/or hardware for reasons that may include the following: (i) real-time performance improvement of computers for display refresh processing; (ii) processor cycle reduction of computer processing during display output generation; (iii) improvement of autonomous computer data selection processing for determining which vertices and edges to process for label generation; and (iv) automated adjustment to increase or decrease quantities of selected vertices and/or edges for which to display/output labels according to available real-time frame rate processing cycles.

As described above in association with FIG. 1 through FIG. 4B, the example systems and processes provide adaptive labeling of network graphs. Many other variations and additional activities associated with adaptive labeling of network graphs are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
by a processor, for each vertex of a network graph that comprises a plurality of vertices:
determining a meta-property of the vertex relative to other vertices of the plurality of vertices;
determining a distance of the vertex from a point that approximates a user's viewpoint relative to a three dimensional (3D) rendering of the network graph on a display, where the point represents a location relative to the rendered network graph at which a set of vectors that each respectively project from each vertex of the rendered network graph focus and terminate to approximate the user's viewpoint; and
calculating a ranking figure as a function of an inverse of a square of the determined meta-property divided by a square of the determined distance;
where the computer-implemented method further comprises the processor:
ranking the plurality of vertices of the network graph as a function of the respective calculated ranking figures; and
selectively displaying, on the display, labels for a subset of the plurality of vertices as a function of the ranking.

2. The computer-implemented method of claim 1, further comprising the processor dynamically updating which of the plurality of vertices form the subset of the plurality of vertices for which labels are selectively displayed responsive to real-time changes of the metaproperties of the plurality of vertices that result from real-time changes in data represented by the respective vertices within the network graph.

3. The computer-implemented method of claim 1, further comprising the processor dynamically adjusting a proportion of the plurality of vertices for which the labels are selectively displayed according to a configured real-time computational performance criterion for display update processing.

4. The computer-implemented method of claim 1, further comprising the processor:
establishing, as bi-modal display output hysteresis:
a first hysteresis phase that defines a minimum display time for displaying the labels for the subset of the plurality of vertices responsive to the labels being displayed; and
a second hysteresis phase that defines a minimum time for not displaying the labels for any of the subset of the plurality of vertices responsive to the display of the labels being stopped; and
reducing real-time label display flicker responsive to real-time changes of the metaproperties of the plurality of vertices according to the bi-modal display output hysteresis.

5. The computer-implemented method of claim 1, further comprising the processor:
monitoring an achieved real-time computational performance of display update processing relative to a threshold real-time computational performance criterion for display update processing, and one of:
responsive to determining that the achieved real-time computational performance exceeds the threshold real-time computational performance criterion for display update processing, increasing a proportion of the plurality of vertices for which the labels are selectively displayed until the achieved real-time computational performance approximates the threshold real-time computational performance criterion; and
responsive to determining that the achieved real-time computational performance is below the threshold real-time computational performance criterion for display update processing, reducing the proportion of the plurality of vertices for which the labels are selectively displayed until the achieved real-time computational performance approximates the threshold real-time computational performance criterion.

6. The computer-implemented method of claim 1, further comprising the processor:
iteratively updating the determined distance, the calculated ranking figure, and the ranking of the plurality of vertices of the network graph responsive to at least one user input instructing a change of the 3D rendering of the network graph; and
selectively displaying, on the display, labels for an updated subset of the plurality of vertices as a function of the updated ranking.

7. A system, comprising:
a display; and
a processor programmed to, for each vertex of a network graph that comprises a plurality of vertices:
determine a meta-property of the vertex relative to other vertices of the plurality of vertices;
determine a distance of the vertex from a point that approximates a user's viewpoint relative to a three dimensional (3D) rendering of the network graph on the display, where the point represents a location relative to the rendered network graph at which a set of vectors that each respectively project from each vertex of the rendered network graph focus and terminate to approximate the user's viewpoint; and
calculate a ranking figure as a function of the determined meta-property in combination with the determined distance, where, in being programmed to calculate the ranking figure as the function of the determined meta-property in combination with the determined distance, the processor is programmed to, for each vertex of the network graph that comprises the plurality of vertices, calculate the ranking figure as a square of the meta-property of the respective vertex divided by a square of the determined distance of the vertex from the point that approximates the user's viewpoint relative to the 3D rendering of the network graph on the display;
where the processor is further programmed to:
rank the plurality of vertices of the network graph as a function of the respective calculated ranking figures; and
selectively display, on the display, labels for a subset of the plurality of vertices as a function of the ranking.

8. The system of claim 7, where the processor is further programmed to dynamically update which of the plurality of vertices form the subset of the plurality of vertices for which labels are selectively displayed responsive to real-time changes of the meta-properties of the plurality of vertices that result from real-time changes in data represented by the respective vertices within the network graph.

9. The system of claim 7, where the processor is further programmed to dynamically adjust a proportion of the plurality of vertices for which the labels are selectively displayed according to a configured real-time computational performance criterion for display update processing.

10. The system of claim 7, where the processor is further programmed to: establish, as bi-modal display output hysteresis:
a first hysteresis phase that defines a minimum display time for displaying the labels for the subset of the plurality of vertices responsive to the labels being displayed; and
a second hysteresis phase that defines a minimum time for not displaying the labels for any of the subset of the plurality of vertices responsive to the display of the labels being stopped; and
reduce real-time label display flicker responsive to real-time changes of the metaproperties of the plurality of vertices according to the bi-modal display output hysteresis.

11. The system of claim 7, where the processor is further programmed to: monitor an achieved real-time computational performance of display update processing relative to a threshold real-time computational performance criterion for display update processing, and one of:
responsive to determining that the achieved real-time computational performance exceeds the threshold real-time computational performance criterion for display update processing, increase a proportion of the plurality of vertices for which the labels are selectively displayed until the achieved real-time computational performance approximates the threshold real-time computational performance criterion; and
responsive to determining that the achieved real-time computational performance is below the threshold real-time computational performance criterion for display update processing, reduce the proportion of the plurality of vertices for which the labels are selectively displayed until the achieved real-time computational performance approximates the threshold real-time computational performance criterion.

12. A computer program product, comprising:
a computer readable storage medium having computer readable program code embodied therewith, where the computer readable storage medium is not a transitory signal per se and where the computer readable program code when executed on a computer causes the computer to, for each vertex of a network graph that comprises a plurality of vertices:
determine a meta-property of the vertex relative to other vertices of the plurality of vertices;
determine a distance of the vertex from a point that approximates a user's viewpoint relative to a three dimensional (3D) rendering of the network graph on a display, where the point represents a location relative to the rendered network graph at which a set of vectors that each respectively project from each vertex of the rendered network graph focus and terminate to approximate the user's viewpoint; and
calculate a ranking figure as a function of an inverse square of the determined meta-property divided by a square of the determined distance;
where the computer readable program code when executed on the computer further causes the computer to:
rank the plurality of vertices of the network graph as a function of the respective calculated ranking figures; and
selectively display, on the display, labels for a subset of the plurality of vertices as a function of the ranking.

13. The computer program product of claim 12, where the computer readable program code when executed on the computer further causes the computer to dynamically update which of the plurality of vertices form the subset of the plurality of vertices for which labels are selectively displayed responsive to real-time changes of the meta-properties of the plurality of vertices that result from real-time changes in data represented by the respective vertices within the network graph.

14. The computer program product of claim 12, where the computer readable program code when executed on the computer further causes the computer to dynamically adjust a proportion of the plurality of vertices for which the labels are selectively displayed according to a configured real-time computational performance criterion for display update processing.

15. The computer program product of claim 12, where the computer readable program code when executed on the computer further causes the computer to:
establish, as bi-modal display output hysteresis:
a first hysteresis phase that defines a minimum display time for displaying the labels for the subset of the plurality of vertices responsive to the labels being displayed; and
a second hysteresis phase that defines a minimum time for not displaying the labels for any of the subset of the plurality of vertices responsive to the display of the labels being stopped; and
reduce real-time label display flicker responsive to real-time changes of the metaproperties of the plurality of vertices according to the bi-modal display output hysteresis.

16. The computer program product of claim 12, where the computer readable program code when executed on the computer further causes the computer to:
monitor an achieved real-time computational performance of display update processing relative to a threshold real-time computational performance criterion for display update processing, and one of:
responsive to determining that the achieved real-time computational performance exceeds the threshold real-time computational performance criterion for display update processing, increase a proportion of the plurality of vertices for which the labels are selectively displayed until the achieved real-time computational performance approximates the threshold real-time computational performance criterion; and
responsive to determining that the achieved real-time computational performance is below the threshold real-time computational performance criterion for display update processing, reduce the proportion of the plurality of vertices for which the labels are selectively displayed until the achieved real-time computational performance approximates the threshold real-time computational performance criterion.

17. The computer program product of claim 12, where the computer readable program code when executed on the computer further causes the computer to:
iteratively update the determined distance, the calculated ranking figure, and the ranking of the plurality of vertices of the network graph responsive to at least one user input instructing a change of the 3D rendering of the network graph; and selectively display, on the display, labels for an updated subset of the plurality of vertices as a function of the updated ranking.

* * * * *